United States Patent
Araki et al.

(10) Patent No.: US 7,695,669 B2
(45) Date of Patent: Apr. 13, 2010

(54) METHOD OF REUTILIZATION AND METHOD OF SHAPING OF WASTE PLASTIC

(75) Inventors: Takayuki Araki, Futtsu (JP); Koichi Fukuda, Futtsu (JP); Kenji Kato, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 790 days.

(21) Appl. No.: 10/576,854

(22) PCT Filed: Oct. 20, 2004

(86) PCT No.: PCT/JP2004/015874

§ 371 (c)(1),
(2), (4) Date: Apr. 20, 2006

(87) PCT Pub. No.: WO2005/037510

PCT Pub. Date: Apr. 28, 2005

(65) Prior Publication Data

US 2007/0135667 A1    Jun. 14, 2007

(30) Foreign Application Priority Data

Oct. 21, 2003    (JP) .............................. 2003-360958

(51) Int. Cl.
B29C 67/00    (2006.01)
(52) U.S. Cl. .................... 264/345; 264/29.1; 264/80; 264/911; 110/346
(58) Field of Classification Search .................. None
See application file for complete search history.

(56) References Cited

U.S. PATENT DOCUMENTS 6,048,380 A * 4/2000 Asanuma et al. .............. 75/414

(Continued)

FOREIGN PATENT DOCUMENTS

JP    48-034901    5/1973

(Continued)

OTHER PUBLICATIONS

Canadian Office Action dated Sep. 4, 2008 issued in corresponding Canadian Application No. 2,543,445.

(Continued)

*Primary Examiner*—Mary Lynn F Theisen
(74) *Attorney, Agent, or Firm*—Kenyon & Kenyon LLP

(57) ABSTRACT

The present invention provides a method of reutilization and method of shaping of waste plastic which reduces the amount of volatile ingredients and oil cake* to extents preferable as materials for coke ovens, enables the formation of plastic granular materials able to maintain suitable shapes even after charging into a coke oven, and does not require expensive facilities for treating any produced hydrogen chloride gas, that is, a method of reutilization of waste plastic characterized by melting waste plastic at over 160° C. to 250° C. in temperature in part or whole, compression shaping it to thereby obtain a plastic granular material having an apparent density of 0.7 to 1.2 kg/liter, and mixing this plastic granular material with coal for dry distillation in a coke oven. By bringing the gas produced at the time of compression shaping the waste plastic into contact with water or an ammonia solution and combining the water or ammonia solution with an ammonia solution of an ammonia solution treatment facility attached to the coke furnace, it is possible to remove the hydrogen chloride contained in the produced gas.

4 Claims, 3 Drawing Sheets

U.S. PATENT DOCUMENTS

| | | | |
|---|---|---|---|
| 6,230,634 B1 * | 5/2001 | Okochi et al. | 110/342 |
| 6,329,496 B1 * | 12/2001 | Komaki et al. | 588/316 |
| 6,436,168 B1 | 8/2002 | Uematsu et al. | |

FOREIGN PATENT DOCUMENTS

| | | |
|---|---|---|
| JP | 59-073917 | 4/1984 |
| JP | 08-157834 | 6/1996 |
| JP | 2001-049261 | 2/2001 |
| JP | 2001-49261 | 2/2001 |
| JP | 2002-012876 | 1/2002 |
| JP | 2003-41265 | 2/2003 |
| KR | 2002-0053505 | 7/2002 |
| WO | WO 00/06668 | 2/2000 |
| WO | WO 03/026862 | 4/2003 |

OTHER PUBLICATIONS

European Search Report dated Aug. 26, 2009 issued in corresponding European Application No. 04 79 2990.

* cited by examiner

ND OF REUTILIZATION AND
METHOD OF REUTILIZATION AND METHOD OF SHAPING OF WASTE PLASTIC

TECHNICAL FIELD

The present invention relates to a method of reutilization of waste plastic, in particular a method of reutilization of waste plastic by dry distillation in a coke furnace and a method of shaping of waste plastic.

BACKGROUND ART

In the past, the scrap plastic and used plastic produced in the plastic processing process (hereinafter referred to as "waste plastic") was incinerated or was disposed of in landfills. As a result, in the case of incineration, there were the problems that the high temperature of combustion damaged the incinerators and that reaction with chlorine caused the production of dioxins. Further, even with disposal in landfills, since plastic does not decompose and the soil does not solidify around it, there was the problem that the newly created land over the landfills was low in value of use.

As a means for dealing with this, various technologies are being put to use for recycling plastic. For example, plastic is being converted to oil or gas, however, this has the problem of a high treatment cost. On the other hand, dry distillation of plastic in a coke furnace is an economical method enabling a large amount of recycling. With dry distillation in a coke oven, coke can be recovered along with fuel gas and oily matter, so this is also an excellent method in terms of the diversity of possible applications.

The method of dry distillation of waste plastic in a coke oven is the method of mixing the waste plastic with coal, charging the mixture into the coke oven, then dry distilling it at about 1200° C. For example, this method is described in Japanese Patent Publication (A) No. 48-34901. While differing depending on the type of the plastic used, about 35% of the plastic becomes coke, about 25% oily matter, and about 40% coke oven gas. The coke derived from the plastic is discharged from the coke oven in a state mixed with the coke derived from the coal and is utilized as a reducing agent or fuel in a blast furnace or iron alloy making process etc.

As explained above, the method of dry distillation of waste plastic in a coke oven is an effective means for economical recycling of plastic. However, there has been no accurate knowledge regarding the relationship between the method of using plastic and the coke quality, so there have been problems in the quality of the coke produced. For example, in the means for recovering large amounts of gas or tar using the technology described in Japanese Patent Publication (A) No. 8-157834, there was no consideration given to coke quality and there was the problem that when a large amount of plastic was mixed in, the coke declined in strength. Note that since coke is used in blast furnaces, cupola furnaces, and other large sized facilities, it has to withstand the load conditions in these furnaces. High strength coke is therefore being sought. The deterioration of coke strength has become an important quality issue.

On the other hand, in the past, the readily available waste plastic produced in the processing of plastic (hereinafter referred to as "scrap plastic") had been used in coke ovens. This scrap plastic was mainly chip-like in form, relatively high in purity, and of a shape able to be used in coke ovens as it was, so in the past there was no knowledge about the effects of its ash content on coke furnace operations or the effects of its apparent density. As a result, even when using used plastic produced from the home etc., which is poor in purity and mostly thin in shape (hereinafter referred to as "used plastic"), the same simple method was employed for using it in coke furnaces. When using this, however, there were detrimental effects on the quality of the coke.

Used plastic has problems due to its poor shape and low apparent density. If using large amounts of too small plastic, for example, plastic of a size of 5 mm or less or a thickness of 1 mm or less, there was the problem that the produced coke declined in strength. Further, if the plastic used was too large, the problem was observed of a drop in the yield of the lump coke. If using large amounts of poor grade, large ash content used plastic, there was the problem of a drop in the strength of the lump coke.

Japanese Patent Publication (A) No. 2001-49261 discloses the method of compression shaping waste plastic to obtain a plastic granular material with an apparent density of 0.40 to 0.95 kg/liter and mixing this with the coal by a mass ratio of 5% or less for dry distillation in a coke ovens. By using granulated plastic having an apparent density of 0.40 kg/liter or more, the problem of coke powdering can be solved. On the other hand, if trying to melt the plastic to shape it, problems arise such as the production of harmful gases at the time of melting, so the melting method is not considered an economical or safe method. As a condition for compression shaping plastic without melting it, the upper limit of the apparent density is deemed to be 0.95 kg/liter. The temperature of the plastic at the time of shaping is made 100° C. or more in order to remove the moisture content of the plastic. If the temperature exceeds 160° C., part of the plastic will start to melt and harmful gases will be produced, so 160° C. or less is considered preferable.

Further, in the method of treatment of waste plastic in a coke furnace described in Japanese Patent Publication (A) No. 2002-12876, the method is disclosed of dechlorinating the waste plastic at a temperature of 300° C., compression shaping it to adjust the density to 0.78 to 1.0 g/cm³, and mixing a predetermined amount of the shaped waste plastic into a coke oven for dry distillation.

DISCLOSURE OF THE INVENTION

The method described in the above-mentioned Japanese Patent Publication (A) No. 2001-49261 prevents the production of harmful gas by limiting the temperature at the time of shaping to 160° C. or less, so at the time of shaping, the waste plastic insufficiently melts and also reaches an apparent density of 0.95 kg/liter or less. This apparent density is on a par with coal, but compared with coal, there are more volatile ingredients, so the oily matter and gas are easily vented. For use as a material for a coke oven, the apparent density is still insufficient. Further, the plastic ingredients not melting at 160° C. remain as granules holding their original shapes in the granulated plastic, so cracks easily form at the granule interfaces. Therefore, it becomes difficult to held the suitable grain size of 5 to 80 mm indicated in Japanese Patent Publication (A) No. 2001-49261 at the start of dry distillation of coke.

On the other hand, in the method described in Japanese Patent Publication (A) No. 2002-12876, the waste plastic is dechlorinated at 300° C. in temperature, but a system becomes necessary for treating the hydrogen chloride gas produced due to this dechlorination and therefore an increase the cost of the equipment and running costs becomes unavoidable.

The present invention has as its object to provide a method of reutilization and method of shaping of waste plastic which reduces the amount of volatile ingredients and oily matter to extents preferable as materials for coke ovens, enables the formation of plastic granular materials able to maintain suitable shapes even after charging into a coke furnace, and does not require expensive facilities for treating any produced hydrogen chloride gas. That is, the present invention has as its gist the following:

(1) A method of reutilization of waste plastic characterized by melting waste plastic at over 160° C. to 250° C. in temperature in part or whole, compression shaping it to thereby obtain a plastic granular material having an apparent density of 0.7 to 1.2 kg/liter, and mixing this plastic granular material with coal for dry distillation in a coke oven.

(2) A method of reutilization of waste plastic as set forth in (1), characterized in that said plastic granular material is mixed with the coal in a ratio, in mass ratio with respect to the coal, of 6 mass % or less.

(3) A method of reutilization of waste plastic as set forth in (1) or (2), characterized by compression shaping the waste plastic by the method of heating it by a heating means and extruding it into a tubular part.

(4) A method of reutilization of waste plastic as set forth in any one of (1) to (3), characterized by bringing the gas produced at the time of compression shaping the waste plastic into contact with water or an ammonia solution and combining the water or ammonia solution with an ammonia solution of an ammonia solution treatment facility attached to the coke oven.

(5) A method of shaping of waste plastic characterized by compression shaping waste plastic by the method of heating it by a heating means and extruding it into a tubular part at over 160° C. to 250° C. in temperature, bringing the gas produced at the time of compression shaping into contact with water or an ammonia solution, and combining the water or ammonia solution with an ammonia solution of an ammonia solution treatment facility attached to the coke oven.

As explained above, the present invention compression shapes waste plastic to obtain a plastic granular material and mixes the plastic granular material with coal for dry distillation in a coke oven. At that time, it melts the waste plastic at over 160° C. in temperature in part or whole and compression shapes it so as to obtain a plastic granular material having an apparent density of 0.7 to 1.2 kg/liter. Due to this, even if a coke oven is charged with a high ratio of plastic, the coke will not be reduced in strength.

Further, the present invention keeps the temperature at the time of compression shaping down to 250° C. or less, brings the gas produced at the time of compression shaping of the waste plastic into contact with water or an ammonia solution, and combines the water or ammonia solution with an ammonia solution of an ammonia solution treatment facility attached to the coke oven coke furnace, so it is possible to remove the hydrogen chloride in the gas produced at the time of compression shaping and possible to perform this treatment for removal inexpensively.

BEST MODE FOR WORKING THE INVENTION

Figure 1:
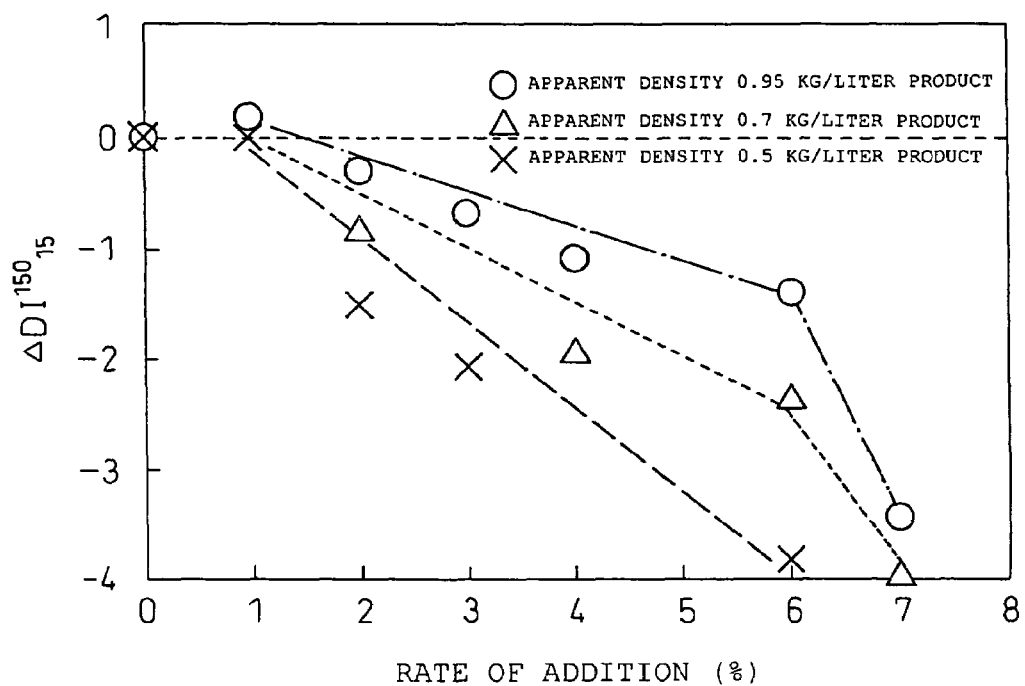
FIG. 1 is a view of the relationship between the ratio of addition of waste plastic to coal and the coke strength.

As the waste plastic used in the present invention, used plastic is mostly used. Used plastic is diverse in ingredients including for example polyethylene, polypropylene, polyacrylonitrile, and polyvinyl chloride and also is often contaminated by remnants of seasoning, beverages, and other matter besides the plastic, so even after a separation and washing operation, is difficult to recover as a resource for recycling of material. In the past, only heat recovery, that is, thermal recycling, through burning was performed. In the present invention, the used plastic, which in this way conventionally could not be effectively reused, is mainly used for recycling of material in a coke furnace to thereby obtain gas, oil, and carbon products (coke). Therefore, in recovery of used plastic, while the plastic is in principle separated for collection, it is diverse in type and includes a large moisture content of as much as 10 to 30%. This used plastic is cleaned of foreign matter, cut, then heated and compression shaped to obtain a granular material.

In the present invention, the waste plastic is melted at over 160° C. to 250° C. in temperature in part or whole and then compression shaped so as to thereby obtain a plastic granular material with an apparent density of 0.7 to 1.2 kg/liter.

However, in the method described in Japanese Patent Publication (A) No. 2001-49261, at the time of compression shaping, the temperature is made 160° C. or less and the plastic is shaped without melting it, so the plastic bonds at only the surface in the shapes as crushed. Therefore, the obtained shaped article is low in density and not homogeneous. Further, the pieces of the plastic are weakly bonded, so the shaped article breaks apart in the process of conveyance or when loaded into the coke furnace. This has a detrimental effect on the coke furnace operation and coke quality.

In the present invention, at the time of compression shaping, the waste plastic is intentionally made to melt in part or whole for shaping, so at the time of compression shaping, the temperature is preferably made over 160° C. Polyethylene substantially completely melts over 160° C. Even polystyrene and other high melting point plastics almost completely melt around 200° C. Further, even PET and other especially high melting point plastics mixed into waste plastic are surrounded by the polyethylene and other plastic melting around them resulting in a high density homogeneous structure. Further, as a result of the melting, the waste plastic will not remain in its original shape in the granular material, so the granular material increases in strength and will not fall apart in shape after being loaded with the coal into the coke oven products. At the time of the compression shaping, the plastic temperature is more preferably made 180° C. or more.

The waste plastic is melted at over 160° C. to 250° C. in temperature in part or whole and compression shaped resulting in a plastic granular material with an apparent density of 0.7 to 1.2 kg/liter as explained above.

When mixing waste plastic with coal for carbonization in a coke oven, the majority of it turns to a gas or ash content due to the heat decomposition reaction and is discharged from the oven together with the coke oven gas. After carbonization, about 20 mass % of a solid residue (mainly carbon ingredient) remains. This residue is extremely porous. The coke structure present around it tends to become brittle. This becomes a cause inviting deterioration of the coke strength and other aspects of quality.

In order to maintain the coke quality without means such as adding caking coal, it is important not to allow an increase in the extremely porous residue derived from the waste plastic (more strictly speaking, an increase in the surface area of the residue). In the present invention, as the means for reducing the surface area of the residue derived from the waste plastic, compression shaping is used to raise the density of the waste plastic. The higher the apparent density of the shaped article of waste plastic, the more the surface area can be expected to be reduced.

FIG. 1 shows the results of investigation of the relationship between the ratio of addition of waste plastic to coal and the coke strength after mixing waste plastic shaped articles having an apparent density of 0.5 kg/liter, 0.7 kg/liter, and 0.95 kg/liter with coal and dry distilling them.

From FIG. 1, by compression shaping waste plastic to raise the apparent density to 0.7 kg/liter or more, even if adding the waste plastic up to 6 mass % in mass ratio with respect to the coal, a drop in the coke strength due to the addition of the waste plastic can be suppressed. On the other hand, if the waste plastic has an apparent density of 0.5 kg/liter or less, when adding the waste plastic up to 6 mass % in mass ratio with the coal, it becomes difficult to keep down the drop in coke strength.

Note that $DI^{150}_{15}$ is the drum strength index of coke (150 rpm+15 mm index) measured in accordance with JIS K2151 (1993), while $\Delta DI^{150}_{15}$ is the amount of change of $DI^{150}_{15}$ when based on the $DI^{150}_{15}$ at the time of a rate of addition of waste plastic of 0% (no addition).

From FIG. 1, when charging a coke furnace with the plastic granular material shaped by the method of the present invention, if the mass ratio of the plastic exceeds 6 mass % with respect to the coal, the problem sometimes arises of a drop in strength of the lump coke if the apparent density of the waste plastic is 0.5 kg/liter or less.

Therefore, the range of charging the plastic granular material of the present invention is preferably made 6 mass % or less with respect to the mass of the coal.

The lower limit of the apparent density of the compression shaped plastic granular material was made 0.7 kg/liter so as to reduce the surface area of the residue derived from the dry distilled waste plastic and suppress any drop in coke strength. Further, if becoming less than 0.7 kg/liter, the charging density of the raw material becomes lower and the productivity of the coke furnace is impaired. Further, when adding the waste plastic up to 6 mass % in mass ratio with respect to the coal, the possibility arises of deterioration in the coke strength and other quality aspects.

Further the upper limit of the apparent density was made 1.2 kg/liter because the true specific gravity of plastic is 1.2 or so, therefore this is believed to be the substantive upper limit of the apparent density obtained.

Figure 2:
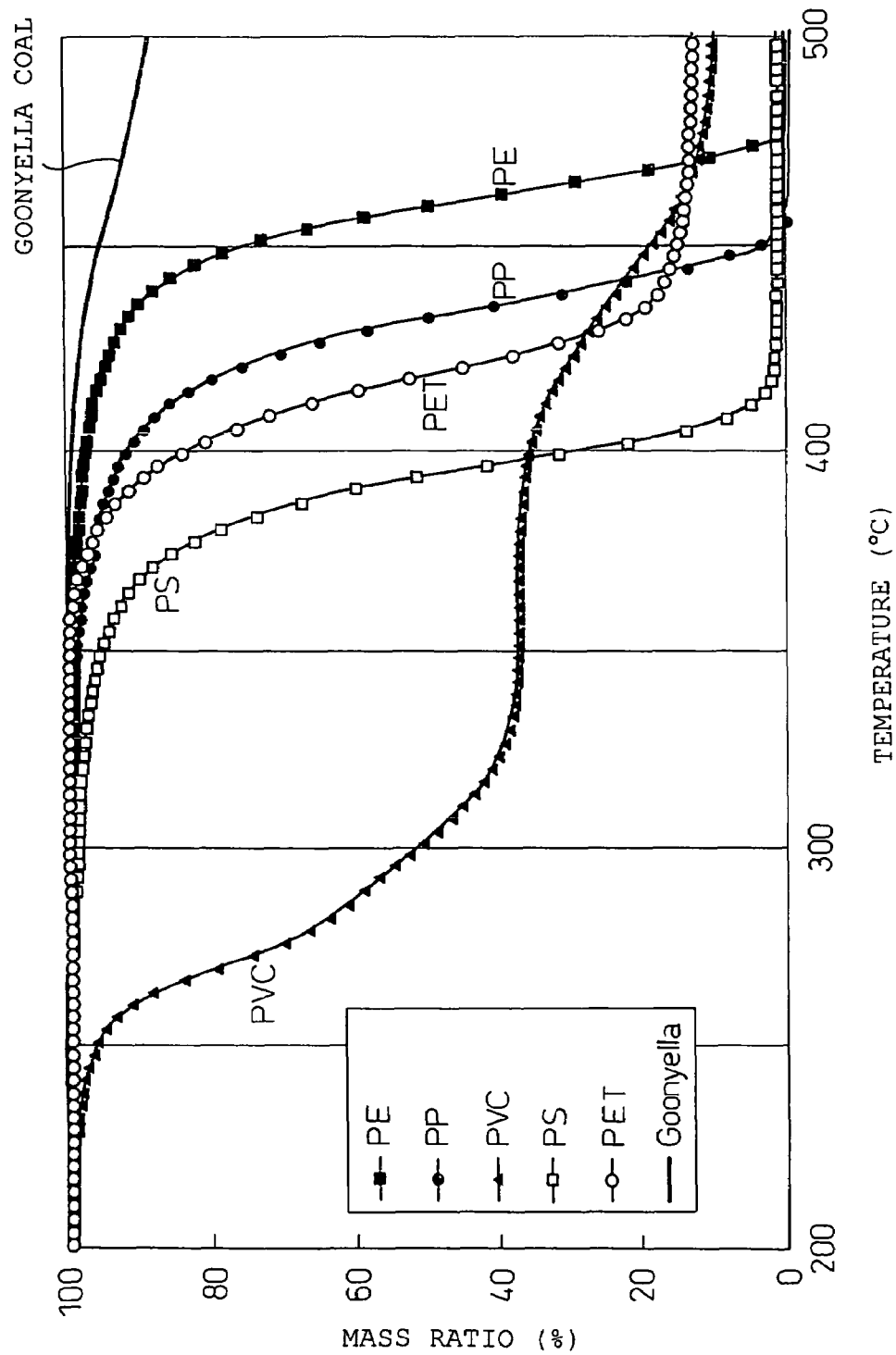
FIG. 2 is a view of the heating temperature of various types of plastic and the state of reduction in mass due to heating.

In the present invention, the upper limit of the temperature of the waste plastic at the time of compression shaping is made 250° C. The waste plastic used in the present invention contains polyvinyl chloride (PVC). FIG. 2 shows the heating temperatures of various types of plastics on the abscissa and the mass after heating on the ordinate (ratio with mass before heating). In the figure, "Goonyella coal" indicates a typical coal for making coke called Goonyella coal, "PVC" indicates polyvinyl chloride, "PE" polyethylene, "PP" polypropylene, "PS" polystyrene, and "PET" polyethylene terephthalate. As clear from FIG. 2, with PVC, at the 200° C. level, there is a sharp drop in mass. When over 300° C., the gradient of the drop in mass becomes smaller.

From this FIG. 2, it will be understood that PVC decomposes and hydrogen chloride is actively produced starting over 250° C. If reaching 300° C., a considerable part of the PVC decomposes and the amount of production of hydrogen chloride greatly increases. In the present invention, the plastic temperature at the time of compression shaping is made 250° C. or less, so the amount of hydrogen chloride produced at the time of compression shaping can be kept low and the hydrogen chloride in the exhaust gas of the compression shaping machine can be easily treated. The plastic ingredients other than the PVC do not decompose at all at 250° C. Just the deposited light oil evaporates. The majority of the gas produced at the time of compression shaping is water vapor. This water vapor contains only a small amount of hydrogen chloride not posing any substantial problem. In the past, it was necessary to first treat the waste plastic for dechlorination down to a temperature of 300° C. or more so as to lower the chlorine content in the waste plastic to less than 0.2 mass % or so, then perform the compression shaping, but in the present invention, it is possible to compression shape waste plastic having a chlorine content of 0.2 mass % or more at 160 to 250° C. in temperature while suppressing the production of hydrogen chloride.

The upper limit of the temperature of the waste plastic at the time of compression shaping is more preferably made 220° C. or less. If 220° C., the decomposition of the PVC, even with variation, remains at 2 to 3%, there is little production of hydrogen chloride, and the water vapor produced only exhibits a weak acidity of pH4 or so.

Figure 3:
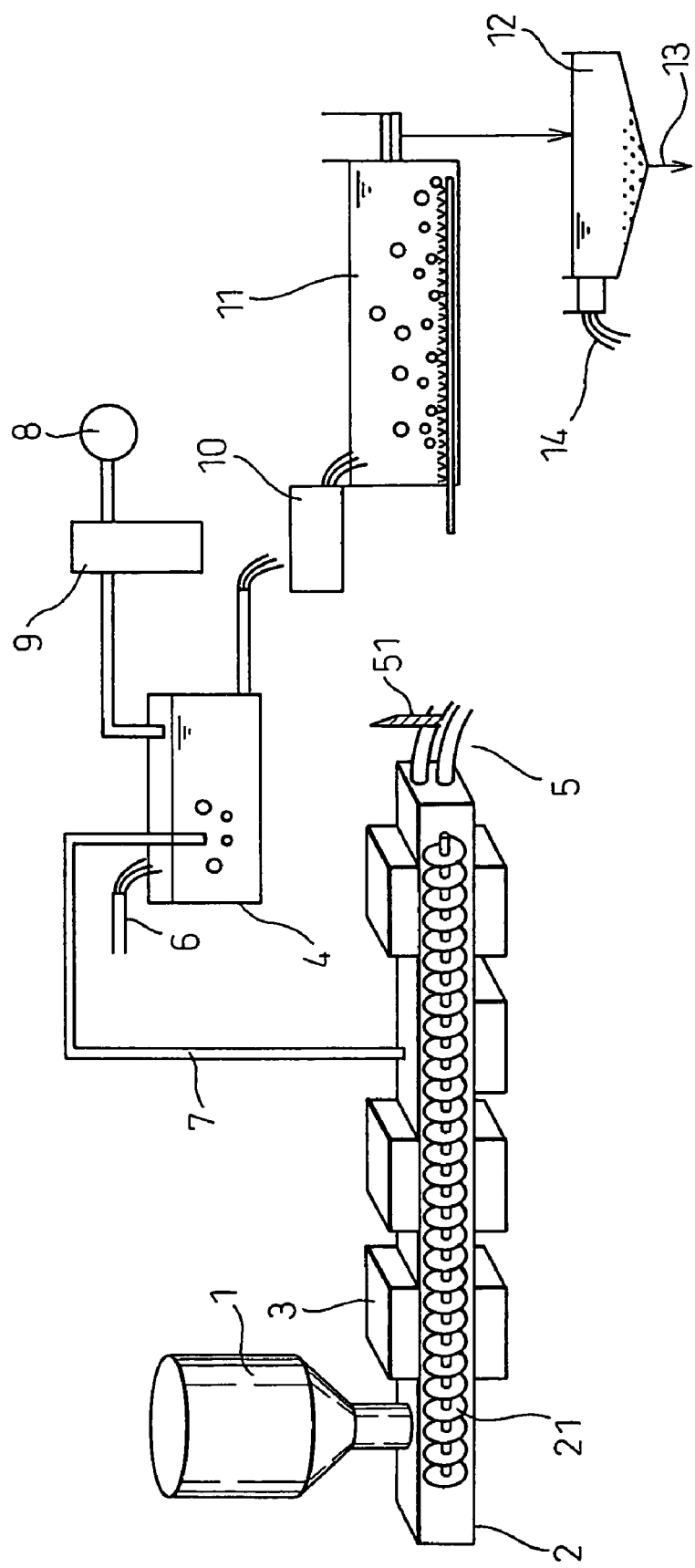
FIG. 3 is a view of a compression shaping machine for waste plastic using the present invention and a system for treating hydrogen chloride in gas produced from this shaping machine.

As the method for compression shaping the waste plastic, for example, it is possible to use a system such as shown in FIG. 3 of extruding the plastic into metal or similar tubular circular dies. An electric heater or other heating means may be added and the heat of friction at the time of compression added to that so as to easily adjust the temperature to over 160° C. to 250° C. in range, so using this system enables economical compression work. As a specific working method, the used plastic cut to suitable sizes is fed from a feeding system (feeder) 1 to the compression shaping machine 2 and is pushed by a compression screw 21 inside the casing of the compression shaping machine 2. The casing is heated by an electric heater or other heating means 3. The plastic is extruded from the system from a dispensing system 5 having a plurality of holes as granules of predetermined sizes. These are cut by a cutter 51 to suitable lengths able to be used in a coke furnace. The compression screw 21 forms a mechanical compression dehydration unit right after the feeding system 1. After this dehydration unit, the heating means 3 and the water cooling pipe are provided to give a temperature control function. An exhaust pipe 7 for the water vapor from the screw part led to the washing system 4 is provided in the middle of the screw machine length.

Note that the cut size of the waste plastic fed from the feeding system 1 to the compression shaping machine 2 is more preferably an average diameter of 50 mm or less from the viewpoints of stable production of high density shaped products and conveyance of the shaped articles.

Further, when using the compression shaping machine 2 to heat and compression shape the waste plastic, depending on the heating conditions, shaping speed, waste plastic composition, etc. the gas produced by heat decomposition of the waste plastic will remain in the shaped article without being fully released from the article and thereby will cause an increase in the voids inside the shaped article and reduce the apparent density of the shaped article somewhat. Due to this, a suction blower 8 etc. should be used to quickly remove the heat decomposition gas of the waste plastic from the shaped article through the exhaust pipe 7 of the shaping machine.

Next, a method of treatment of the gas produced during compression shaping of the waste plastic will be explained.

The main ingredient of the gas produced at the time of compression shaping is water vapor. Further, in the present invention, the plastic temperature at the time of compression shaping is 250° C. or less, so even when compression shaping waste plastic having a chlorine content of 0.2 mass % or more, the amount of hydrogen chloride produced is not that great. Therefore, the only ingredients to be removed are the slight hydrogen chloride and the light oil content, so it is not necessary to provide a large-scale hydrogen chloride treatment system.

In the present invention, the gas produced at the time of compression shaping the waste plastic is brought into contact with water or an ammonia solution. As the method of contact, the method of blowing the gas into a washing tank 4 filled with water or an ammonia solution to make the gas bubble up through it or the method of scattering or spraying the gas pathway with drops of water or the ammonia solution may be used. In this contact, the drained moisture, hydrogen chloride, and oil content in the gas are trapped in the water or ammonia solution, so the hydrogen chloride in the gas can be removed. At this time, the heat of the water vapor in the gas is transferred to the water or ammonia solution, so fresh water or ammonia solution is made to continuously flow into the washing tank 4 to cause overflow. In the washing tank 4, the volume is reduced when draining the water vapor, so a suction blower 8 is provided to suck out the exhaust gas. The sucked out gas is brought to the washing tank 4. Since there is a residual ammonia odor due to the ammonia solution mist, a washing system 9 having two fresh water spray zones is provided to wash this. The washing water is combined with the overflow ammonia solution.

When bringing the gas into contact with water, the hydrogen chloride in the gas dissolves in the water and the water becomes a weakly acidic hydrochloric acid. When bringing the gas into contact with an ammonia solution, the hydrogen chloride in the gas and the ammonia in the ammonia solution react and form an ammonia solution containing ammonium chloride.

Next, the water or ammonia solution with the hydrogen chloride dissolved in it is combined with the ammonia solution of the ammonia solution treatment facility attached to the coke furnace. When causing overflow from the tank as explained above, it is sufficient to combine the overflow water with the ammonia solution of the ammonia solution treatment facility. The water or ammonia solution from the washing tank 4 is first stripped of oil content by the coke filter 10, then is combined with the ammonia solution in an aeration tank 11 of the coke furnace ammonia solution treatment facility. In the aeration tank 11, the water soluble organic matter is broken down by microorganism action for aeration treatment, then the microorganism floc is allowed to settle in the sedimentation tank 12 for settling treatment so as to obtain clean water which is then discharged in the ocean or rivers. The chlorine content derived from the plastic is lower in concentration than that contained in the original ammonia solution derived from the coal. No special treatment is therefore required for discharge.

The grain size of the plastic granular material shaped and dry distilled in the coke furnace in the present invention is preferably 5 to 80 mm. The gas content and oil content in the plastic were vented during the dry distillation in the coke furnace. As a result, when the size is 5 mm or less, the coke in the part where the plastic had been present is formed with a large number of small holes, that is, becomes honeycomb in state. As a result, the coke strength falls. Further, when using a shaped article of 80 mm or more size, the coke produced is formed with large holes. These parts often connect. Portions with large ash content are formed there making the coke easier to break at those parts. As a result, the rate of production of powder increases and the lump coke yield deteriorates. However, when using plastic of 5 mm to 80 mm size, these problems will not arise and it becomes possible to produce coke with no difference from ordinary coke in powdering and in coke strength.

The method of shaping of waste plastic using of the present invention using an ammonia solution treatment facility attached to the coke furnace for treatment of gas produced at the time of compression shaping can be used for applications other than use of plastic as a material charged into a coke furnace. That is, the method of shaping of waste plastic is characterized by compression shaping waste plastic by the method of heating it by a heating means and extruding it into a tubular part at over 160° C. to 250° C. in temperature, bringing the gas produced at the time of compression shaping into contact with water or an ammonia solution, and combining the water or ammonia solution with an ammonia solution of an ammonia solution treatment facility attached to the coke furnace. The plastic temperature at the time of compression shaping is 250° C. or less, so the amount of hydrogen chloride produced is not that large. Further, an ammonia solution treatment facility attached to the coke furnace can be used to treat the hydrogen chloride, so the gas can be treated extremely inexpensively.

The waste plastic obtained by the method of shaping of waste plastic of the present invention is promising for use as not only raw material for charging into coke ovens, but also as fuel for the recently newly spreading blast furnace type refuse melting furnaces.

EXAMPLES

Using the method of reutilization of waste plastic of the present invention, waste plastic of the properties shown in Table 1 was reutilized in a coke oven. Note that the content of chlorine in PVC is about 55 mass %, so based on Table 1, the waste plastic had a chlorine content of about 3 mass %. Further, the coal used was blended coal of a 1:1 mixture of the process raw coal A and process raw coal B of the properties shown in Table 2. The treatment conditions are shown in Table 3. As an index of quality of the carbonized, the coke strength index is shown. Note that the plastic granular material was produced in the system shown in FIG. 3 and was dry distilled in a coke furnace at 1250° C. Comparative Example 1 shows the results of operation when producing coke using only coal as a material and without charging any plastic. Further, Comparative Examples 2 to 5 show cases where the temperatures at the time of compression shaping were outside the range of the present invention. The gas produced at the time of compression shaping was treated to remove the hydrogen chloride.

TABLE 1

| Ingredients (mass %) | | | | | | |
|---|---|---|---|---|---|---|
| PS | PE | PVC | PP | PET | PVDC | Others |
| 25 | 23 | 6 | 14 | 16 | 0.3 | 15.7 |

TABLE 2

|  | Industrial analysis | | Coal fluidity MF |
|---|---|---|---|
|  | VM (%) | Ash (%) | [log(ddpm)] |
| Process raw coal A | 23.7 | 8.8 | 2.96 |
| Process raw coal B | 34.7 | 8.8 | 2.08 |

TABLE 3

| Test conditions/ results | Test No. | | | | | | | | | | | |
|---|---|---|---|---|---|---|---|---|---|---|---|---|
|  | Invention Examples | | | | | | | Comparative Examples | | | | |
|  | 1 | 2 | 3 | 4 | 5 | 6 | 7 | 1 | 2 | 3 | 4 | 5 |
| Compression shaping temperature (° C.) | 220 | 170 | 200 | 210 | 200 | 200 | 200 | — | 160 | 110 | 100 | 110 |
| Grain size (mm) | 50 | 50 | 25 | 25 | 25 | 25 | 25 | — | 25 | 25 | 25 | 25 |
| Apparent density (kg/liter) | 1.10 | 0.70 | 0.95 | 0.95 | 0.94 | 0.93 | 0.95 | — | 0.70 | 0.51 | 0.53 | 0.50 |
| Rate of mixture with respect to coal (%) | 2.0 | 2.0 | 1.0 | 2.0 | 3.0 | 4.0 | 6.0 | — | 4.0 | 2.0 | 3.0 | 6.0 |
| Coke strength index | 84.2 | 83.4 | 84.4 | 84.0 | 83.7 | 83.3 | 83.0 | 84.4 | 82.2 | 82.9 | 82.3 | 80.6 |

Invention Example 1 is an example of typical conditions of the present invention. The plastic granular material was shaped as granules with an aspect ratio of about 1 and an average size of 50 mm. The size was substantially equal to the maximum size of the coal used in the coke furnace. Plastic granules corresponding to large coal granules were included. The apparent density was 1.10 kg/liter and the ratio of mixture with the coal was 2.0%. Under these conditions, the dry distilled coke strength index was 84.2. It was confirmed that, compared with the coke strength of 84.4 of Comparative Example 1 of the result of operation without using any plastic, there was no drop due to the plastic.

Invention Example 2 was performed under conditions substantially the same as in Invention Example 1 except the shaping temperature was kept down to 170° C. As a result, to the extent the shaping temperature was lower than the 220° C. of Invention Example 1, polystyrene (PS), polyethylene terephthalate (PET), and other difficult to melt plastic ingredients were left, some fluffing occurred at the surface of the plastic granular material, the filling property dropped somewhat, and the apparent density fell to 0.70 kg/liter. Due to this, the packability when mixed with the coal dropped, so the coke strength index became only 83.4.

Invention Examples 3 to 7 had die sizes of the cutting systems smaller than Invention Example 1 so as to give an average size of 25 mm, so the bulk densities of charging in the coke furnace were somewhat lower than the 50 mm of Invention Example 1, the apparent densities were 0.93 to 0.95 kg/liter—showing that the packability at the time of mixing with the coal fell somewhat. The effect of the drop in the coke strength index due to the drop in the packability becomes more conspicuous along with the increase in the ratio of mixture of the plastic in the coal. In the case of the 1.0% mixing ratio of Invention Example 3, the coke strength index was 84.4, but in the case of the 6.0% mixing ratio of Invention Example 7, the coke strength index was only 83.0. However, in each of Invention Examples 1 to 7, a good coke strength index could be realized compared with the comparative examples run under conditions outside the range of the present invention.

Comparative Examples 2 to 5 had temperatures at the time of compression shaping of low temperatures of 100 to 160° C., so the coke strength index was low in each case.

Invention Examples 1 to 7 had plastic temperatures at the time of compression shaping higher than Comparative Examples 2 to 5, so the amounts of harmful gas produced at the time of shaping, including water vapor and hydrogen chloride, increased, but these were all trapped in the washing system 4 in ammonia solutions. Rather, compared with Comparative Examples 2 to 5 suppressed in temperature, but not having washing systems, the exhaust was lower in temperature and freer of moisture, had less irritating odor, and naturally also had less hydrogen chloride content in the gas.

INDUSTRIAL APPLICABILITY

As explained above, by establishing a gas washing system and enabling high temperature shaping so as to raise the apparent density of the plastic granular material, it is possible to establish a method preventing a drop in coke strength even with a high ratio of charging of plastic in the coke oven. Further, by setting the temperature range at the time of compression shaping to a suitable range and melting the plastic in part or whole for compression shaping and simultaneously using an ammonia solution treatment facility attached to the coke furnace as a treatment facility for hydrogen chloride-containing gas, it becomes possible to economically treat the waste plastic without requiring large-scale additional facilities.

The invention claimed is:

1. A method of reutilization of waste plastic characterized by melting waste plastic at over 160° C. to 250° C. in temperature in part or whole, compression shaping it by means of bringing the gas produced at the time of compression shaping the waste plastic into contact with water or ammonia solution and combining the water or ammonia solution with an ammonia solution of an ammonia solution treatment facility attached to a coke oven, to thereby obtain a plastic granular material having an apparent density of 0.7 to 1.2 kg/liter, and mixing this plastic granular material with coal for carbonization in the coke oven.

2. A method of reutilization of waste plastic as set forth in claim 1, characterized in that said plastic granular material is mixed with the coal in a ratio, in mass ratio with respect to the coal, of 6 mass % or less.

3. A method of reutilization of waste plastic as set forth in claim 1, characterized by compression shaping the waste plastic by the method of heating it by a heating means and extruding it into a tubular part.

4. A method of shaping of waste plastic characterized by compression shaping waste plastic by the method of heating it by a heating means and extruding it into a tubular part at over 160° C. to 250° C. in temperature, bringing the gas produced at the time of compression shaping into contact with water or an ammonia solution, and combining the water or ammonia solution with an ammonia solution of an ammonia solution treatment facility attached to the coke oven.

* * * * *